DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1161

T880,002

MANEB FORMULATIONS INCLUDING SILICONE OILS CONTAINING COLLOIDAL SILICA

Christian B. Luginbuhl, 127 Nevada Ave., Shipley Heights, Wilmington, Del. 19803

Continuation-in-part of application Ser. No. 639,273, May 18, 1967. This application Apr. 29, 1969, Ser. No. 820,324

Int. Cl. A01n *9/12*

U.S. Cl. 424—286

No Drawing. 14 Pages Specification

A fungicidal spray composition suitable for spraying is made by adding to a maneb wettable powder, hydrocarbon spray oil, emulsifier and water formulation, a silicone oil containing colloidal silica as an antifoam agent. The silicone oil antifoaming agents are dimethylpolysiloxanes made of

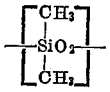

units in combination with a small amount of colloidal silica, less than 5% by weight.